(No Model.)

E. ROAT.
FEED WATER PURIFIER.

No. 246,910. Patented Sept. 13, 1881.

WITNESSES:

INVENTOR.

Edwin Roat

BY

ATTORNEY.

UNITED STATES PATENT OFFICE.

EDWIN ROAT, OF BUFFALO, NEW YORK, ASSIGNOR OF ONE-HALF TO HARRY HAMLIN, OF SAME PLACE.

FEED-WATER PURIFIER.

SPECIFICATION forming part of Letters Patent No. 246,910, dated September 13, 1881.

Application filed June 8, 1881. (No model.)

*To all whom it may concern:*

Be it known that I, EDWIN ROAT, a citizen of the United States, residing at Buffalo, in the county of Erie and State of New York, have invented certain new and useful Improvements in Feed-Water Purifiers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the purifying of water to prevent scaling or incrustation of boilers; and it consists in subjecting the water, by means of my improved apparatus, to the action of steam for the purpose of effecting a separation and removal of its impurities.

The means which I employ consist substantially of an outer drum or chamber connected with the boiler, in which is placed a cylinder open at the top and having a converging bottom, where the impurities of the water are deposited, and from which they are expelled by steam-pressure. Inside of this cylinder is secured, near the top thereof, a downwardly-converging diaphragm. This cylinder is provided with a series of openings below its junction with the converging diaphragm. At a suitable place in the drum is inserted an inlet-pipe, which projects inwardly and then upwardly at or near the center of the drum, and over which is suspended a bonnet of suitable form to project the water which is forced through the inlet-pipe downwardly upon the surface of the converging diaphragm in the form of a spray. The drum is further provided with a discharge-pipe, through which the water, when purified, is conveyed to the boiler. The water comes in contact with the steam as it is discharged into the drum, and its temperature is maintained by heated flues surrounding the apparatus.

Figure 2:
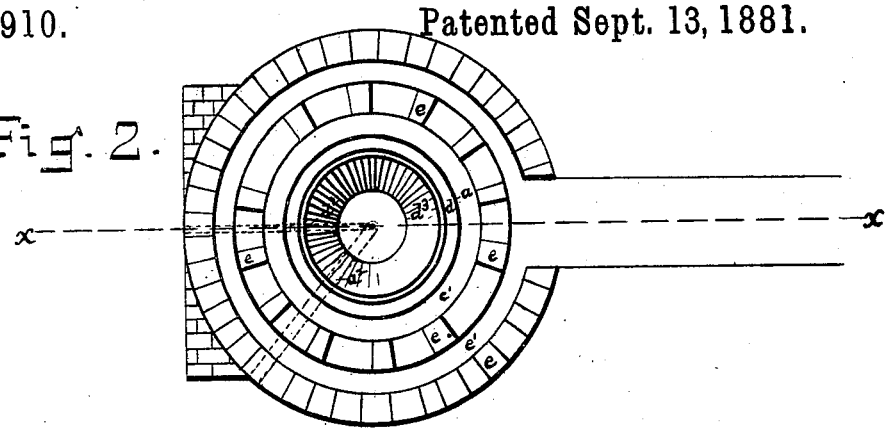
Figure 1:
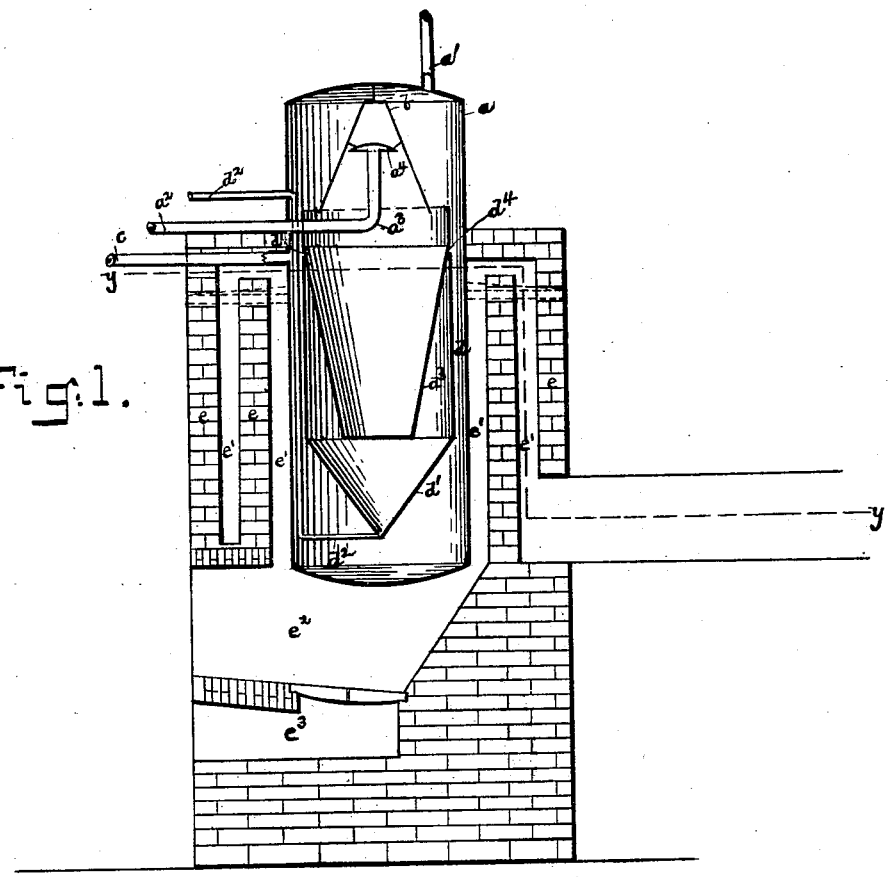

In the drawings, Figure 1 is a vertical section in line $x\,x$ of Fig. 2, and Fig. 2 is a horizontal section in line $y\,y$ of Fig. 1.

$a$ is the drum or chamber, of the form substantially as shown, and is constructed of boiler-iron. It is provided at or near the head with inlet-pipe $a'$, through which steam from the boiler is introduced for heating the water as it falls in a spray upon the converging diaphragm below. $a^2$ is an inlet-pipe, which, as shown in Fig. 1, extends to about the center of the drum, where it is bent upwardly, as shown at $a^3$. The open end of inlet-pipe $a^2$ is surrounded with a downwardly-curved top piece, $a^4$. Above this top piece $a^4$ is a bonnet, $b$, preferably secured at its top to the drum $a$, and at suitable points in its circumference to the top piece, $a^4$. The drum $a$ is further provided with an outlet-pipe, $c$, through which to convey the purified water to the boiler. $d$ represents an inner cylinder, suitably secured in substantially the position shown in Fig. 1. This cylinder is open at the top and provided with a converging bottom, $d'$, to the lower portion of which is connected the blow-off pipe $d^2$, through which the collected impurities are removed from the apparatus, when necessary, by steam-pressure. At or near the top of this inner cylinder, $d$, is secured the downwardly-converging diaphragm $d^3$. The lower opening of this diaphragm $d^3$ is so located with relation to the converging bottom of cylinder $d$ as to leave sufficient space below it for the deposition of the impurities and to allow for the upward passage of the purified water between the outer walls of the diaphragm $d^3$ and the inner walls of cylinder $d$, from whence it passes through a series of openings, $d^4$, in the cylinder $d$, just below its junction with the converging diaphragm $d^3$, into the lower portion of the drum $a$, and from thence through outlet-pipe $c$ into the boiler.

The drum is is provided with the usual manhole and steam-gage.

This apparatus is supported in masonry, (shown at $e$,) in which flues $e'$, leading from the fire-box $e^2$, are constructed, by means of which a suitable temperature of the water in drum $a$ is maintained during its passage through said drum into the boiler. At $e^3$ is shown the usual ash-pit.

The operation of my device is as follows: The water is introduced into the drum through the inlet-pipe $a^2$, from whence it is projected against the inner surface of the bonnet $b$. In falling it strikes the downwardly-curved top piece, $a^4$, by means of which it is reduced to a spray, which strikes the inner surface of the converging diaphragm $d^3$. In its passage from the bonnet to the diaphragm the spray is subjected to the action of the steam introduced through inlet-pipe $a$, effecting a separation of its impurities, which are collected and held in the converging bottom $d'$ of cylinder $d$, and from which they are blown out through pipe $d^2$ at suitable intervals. The purified water then passes upwardly between the diaphragm $d^3$ and cylinder $d$ through openings $d^4$, and into the lower portion of drum $a$, from whence it passes through outlet-pipe $c$ into the boiler. The proper temperature of the water in its passage through the drum is maintained both by the introduced steam and the heated flues surrounding the apparatus.

I claim—

1. In an apparatus for purifying water for use in boilers, the combination of a drum or chamber suitably connected with the boiler, an inner cylinder with open top and converging bottom, and suitably-placed openings in its sides, a converging diaphragm secured to said cylinder, and means for spraying the water and removing the collected impurities from the converging bottom of the inner cylinder, substantially as shown and described.

2. The combination of a drum or chamber suitably connected with the boiler, an inner cylinder with open top and converging bottom and suitably-placed openings in its sides, a converging diaphragm secured to said cylinder, suitable means for spraying the water and removing the collected impurities from the converging bottom of the inner cylinder, and flues surrounding the drum for maintaining the temperature of the water, substantially as shown and described.

EDWIN ROAT.

Witnesses:
HENRY DEMING,
W. T. MILLER.